United States Patent
Duan et al.

(10) Patent No.: US 7,664,267 B2
(45) Date of Patent: Feb. 16, 2010

(54) BIT BASED ARITHMETIC CODING USING VARIABLE SIZE KEY CIPHER

(75) Inventors: Chenggang Duan, Shanghai (CN); Fengguang Zhao, Shanghai (CN); Sunil K. Gupta, Edison, NJ (US)

(73) Assignee: Agere Systems Inc., Allentown, PA (US)

( * ) Notice: Subject to any disclaimer, the term of this patent is extended or adjusted under 35 U.S.C. 154(b) by 733 days.

(21) Appl. No.: 11/170,900

(22) Filed: Jun. 30, 2005

(65) Prior Publication Data

US 2005/0254646 A1 Nov. 17, 2005

Related U.S. Application Data

(63) Continuation of application No. 09/725,910, filed on Nov. 30, 2000, now abandoned.

(30) Foreign Application Priority Data

Nov. 29, 2000 (CN) ............................. 00 1 34266

(51) Int. Cl.
*H04L 9/00* (2006.01)
*H04K 1/00* (2006.01)
*H03M 7/00* (2006.01)
*H04L 9/06* (2006.01)

(52) U.S. Cl. .................... 380/269; 360/28; 708/203; 341/107

(58) Field of Classification Search ............... 380/269; 341/107; 708/203
See application file for complete search history.

(56) References Cited

U.S. PATENT DOCUMENTS

| | | | | |
|---|---|---|---|---|
| 1,310,719 A | * | 7/1919 | Vernam | ........................ 380/33 |
| 4,973,961 A | * | 11/1990 | Chamzas et al. | .............. 341/51 |
| 5,025,258 A | * | 6/1991 | Duttweiler | .................. 341/107 |
| 5,297,207 A | * | 3/1994 | Degele | ......................... 380/46 |
| 5,650,783 A | * | 7/1997 | Murashita et al. | ........... 341/107 |
| 6,259,388 B1 | * | 7/2001 | Zhao | .......................... 341/107 |
| 6,301,361 B1 | * | 10/2001 | Mischenko et al. | ........... 380/28 |

(Continued)

OTHER PUBLICATIONS

Witten, I. H. and Cleary, J. G. 1988. On the privacy afforded by adaptive text compression. Comput. Secur. 7,4 (Aug. 1988), 397-408.*

(Continued)

*Primary Examiner*—Matthew T Henning
(74) *Attorney, Agent, or Firm*—Ryan, Mason & Lewis, LLP

(57) ABSTRACT

An encryption device and method and decryption device and method which implement a bit-based encryption scheme and hardware design. The encryption device includes a random number generator, receiving a main key, determining a working key using at least one random number and outputting a working key, a model, receiving the main key, the working key and plain text to be encoded and generating at least two frequency counts. The encryption device further includes an encoder, which outputs encoded text based on the working key, the plain text and the at least two frequency counts. The encryption device and method and decryption device and method process encrypted text that is based upon a stream structure with an unlimited key length and may be compressed by 50%. The encoded text is changeable with different environments even for the same plain text and the same key. Operations of the hardware design are based on arithmetic additions and shifts, and not multiplications and divisions. As a result, the hardware design is simple and applicable to cryptography and e-commerce.

23 Claims, 5 Drawing Sheets

OTHER PUBLICATIONS

Witten, I. H., Neal, R. M., and Cleary, J. G. 1987. Arithmetic coding for data compression. Commun. ACM 30, 6 (Jun. 1987), 520-540.*

Bergen, H. A. and Hogan, J. M. 1992. Data security in a fixed-model arithmetic coding compression algorithm. Comput. Secur. 11, 5 (Sep. 1992), 445-461.*

* cited by examiner

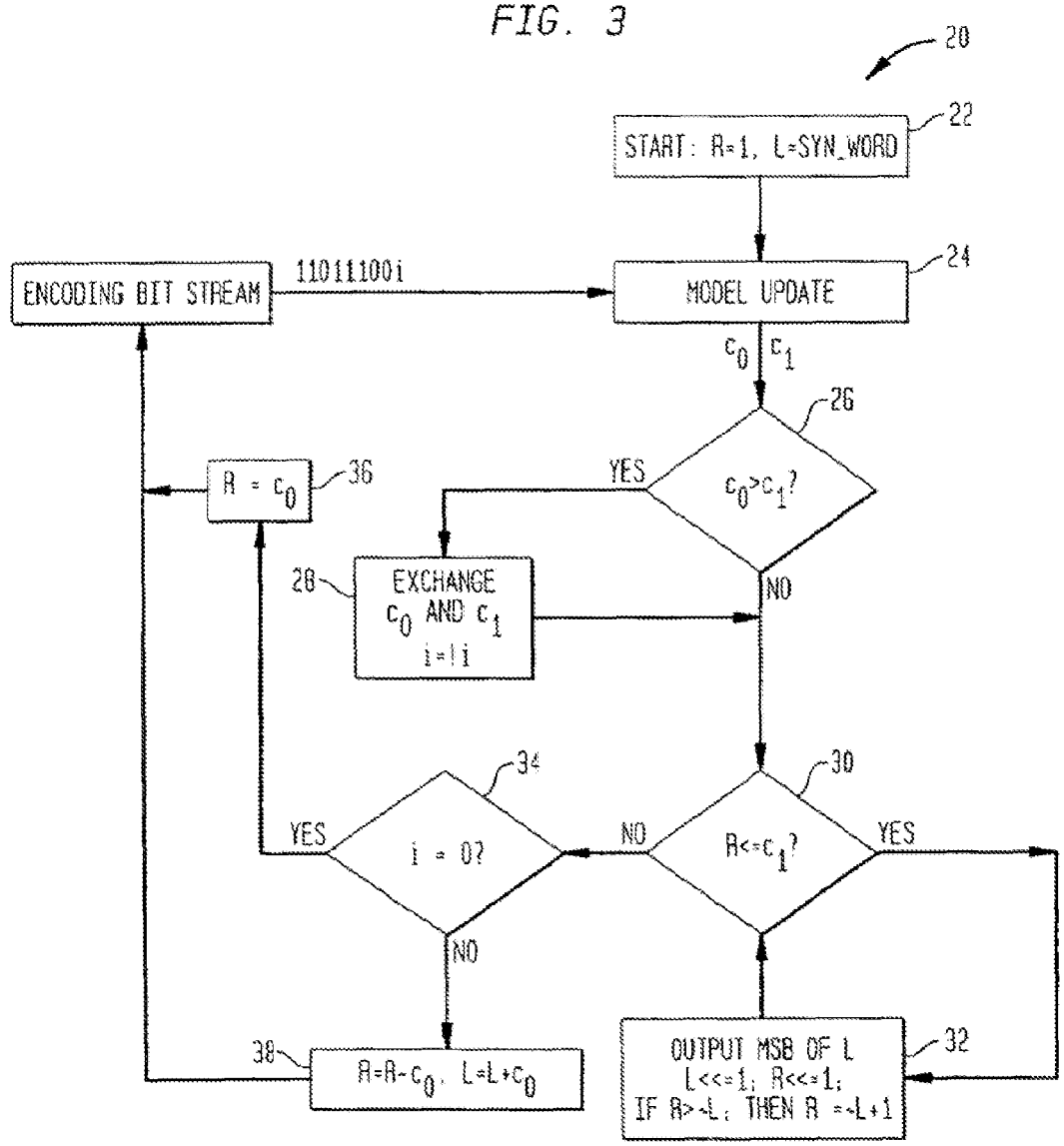

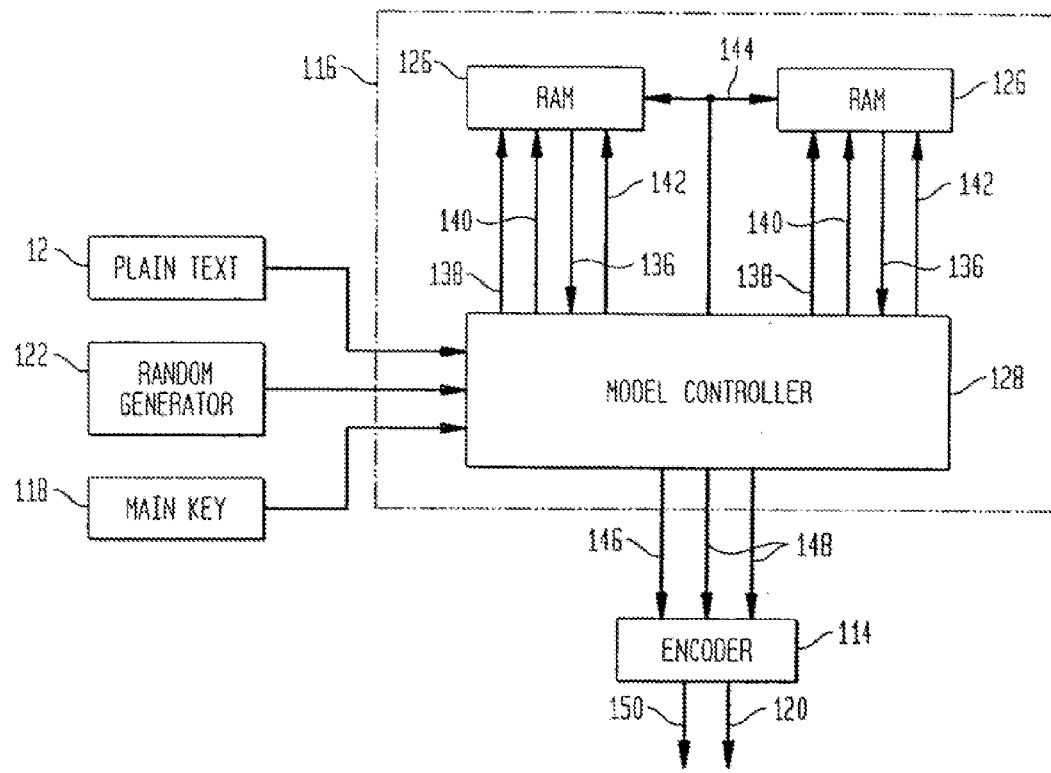

BIT BASED ARITHMETIC CODING USING VARIABLE SIZE KEY CIPHER

This application is a continuation of prior application Ser. No. 09/725,910 filed Nov. 30, 2000 now abandoned.

FIELD OF THE INVENTION

The present invention is directed to encryption and decryption, and more particularly, to a variable size key cipher and method and device for utilizing variable size key cipher to perform encryption and decryption.

DESCRIPTION OF THE RELATED ART

Traditionally, compression and cryptography have been considered distinct and separate technologies, which were developed and applied separately. However, they share a common goal of removing redundancy of an output, although they do so in different ways. Recognizing this common goal, Witten, Neal and Cleary (hereafter known as WNC) were the first to apply adaptive arithmetic coding to encryption. In particular, WNC made the following observations:

by re-coding messages, compression protects the messages from casual observers;
removing redundancy denies a cryptanalyst the leverage of exploiting the normal statistical regularities in natural language; and
adaptively taking advantage of the characteristics of the data being transmitted provides good compression performance.

The properties identified in these three observations appear to offer the benefits of good compression as well as good security—the best of both worlds.

The schematic flow of a conventional, general, arithmetic coding, model-based encryption scheme 10, such as the WNC scheme, is illustrated in FIG. 1. As illustrated in FIG. 1, plain text 12 is input to both an encoder 14 and a model 16. A key 18 is also input to the model 16. The encoder 14 produces cipher text 20 based on the plain text 12 and an output of the model 16. The model 16 provides, in any given context, a probability distribution for the next character. The simplest models are insensitive to context and give the same distribution regardless of the neighboring character. The model 16 should not assign zero probability to any symbol that actually occurs, otherwise the symbol cannot be coded because the upper and lower ends of its range coincide. For encoder 14, a source symbol alphabet is chosen and each symbol is assigned a probability of occurrence. The interval range is usually 0 to 1 and each source symbol occupies a subinterval in the range according to its probability. The interval is successively subdivided as each new source symbol is read. Highly probable symbols reduce the interval by a smaller amount than less probable symbols. The cipher text 20 is represented by a value in the interval. Such a system is described in "Data Security in a Fixed-Model Arithmetic Coding Compression Algorithm" published in Computer & Security, 11(1992), pp. 445-461.

As the name arithmetic coding might suggest, the source symbols which make up the plain text 12 are encoded numerically. Each symbol does not necessarily translate into the same fixed code which makes up the cipher text 20 each time the symbol is encoded. An input source string, which may be a string of source symbols, is usually represented by an interval of real numbers between 0 and 1. The range of the interval may initially be defined by a value proportional to the probability of the symbol in question. The interval may be successively subdivided as each new source symbol is read from the plain text 12. Highly probable symbols in the plain text 12 reduce the interval by a smaller amount than less probable symbols. As an analogy, the arithmetic coding, as illustrated in FIG. 1, is like using a flexible ruler to measure a symbol string.

The WNC scheme is a byte-based arithmetic coding scheme for encryption that utilizes a frequency table without a random generator. Key features of the WNC scheme are a byte-based model and an initial frequency table as the key for encryption. In WNC, the working key and main key are the same.

However, subsequent research by Bergen et al. in "Data Security in a Fixed-Model Arithmetic Coding Compression Algorithm", Computer & Security, pp. 445-461, 1992, has shown that there are security issues with the WNC scheme. In particular, the WNC implementation of a fixed model arithmetic-coding algorithm promotes easy analysis and therefore the possibility of easy and straightforward deciphering. This ease of analysis and deciphering is the direct result of repeating fixed sub-strings in the output, which characterize each particular symbol. The fixed nature of the WNC implementation permits relatively easy determination of both the ordering of symbols in the initial frequency table and the actual values of the symbol frequencies. As a result, it is difficult to design a secure model and key control for the WNC encryption scheme.

SUMMARY OF THE INVENTION

The present invention solves the problems with conventional arithmetic coding techniques by providing an encryption device and method and a decryption device and method which are based on a bit-based arithmetic coding technique. The encryption device and method and the decryption device and method utilize frequency tables for value 0 and 1 and a random generator. The frequency tables include working keys not main keys, as in conventional techniques. At the beginning of the encoding, a main key is input into an encoder. A model initializes the frequency table according to the main keys and a random bit to form a working key. The working key, which is changeable, is used as the probability to encode plain text. The model in the present invention updates the probability according to the input text.

More specifically, the present invention is directed to an encryption device, comprising a random number generator, receiving a main key, determining a working key using at least one random number and outputting the working key; a model, receiving the main key, the working key and plain text and generating at least two frequency counts; and an encoder, outputting cipher text, based on the working key, the plain text, and the at least two frequency counts.

Further, the present invention is directed to a method of encrypting, comprising processing random bits and key bits to generate at least one frequency table; and encoding plain text using the at least one frequency table. Still further, the present invention is directed to a decryption device, comprising a model, receiving a main key, a working key and plain text and generating at least two frequency counts; a decoder, outputting plain text, based on the working key, the main key, the plain text, the at least two frequency counts, and a random number generator, receiving the plain text and determining the working key using at least one random number and outputting the working key to said model. Still further, the present invention is directed to a method of decrypting, comprising processing random bits and key bits to generate at least one frequency table; and decoding cipher text using the at least one frequency table.

A bit-based encryption scheme and hardware design of the present invention produces a cipher that is based upon stream structure and with an unlimited key length. The cipher also has the advantage that it may compress plain text by at least 50%. The cipher is changeable with different environment even for the same plain text and the same key. Operations in the hardware design are based on arithmetic additions and shifts, no multiplication and divisions are included. Therefore, the hardware design is simple. The cipher, encoder, decoder and methods are applicable to cryptography and e-commerce.

BRIEF DESCRIPTION OF THE DRAWINGS

FIG. 3 illustrates a flowchart for encoding in one embodiment of the present invention; and FIG. 4 illustrates a model in more detail in one exemplary embodiment of the present invention.

FIG. 5 illustrates the frequency table in one exemplary embodiment of the present invention.

DETAILED DESCRIPTION OF THE PREFERRED EMBODIMENT

Figure 1:
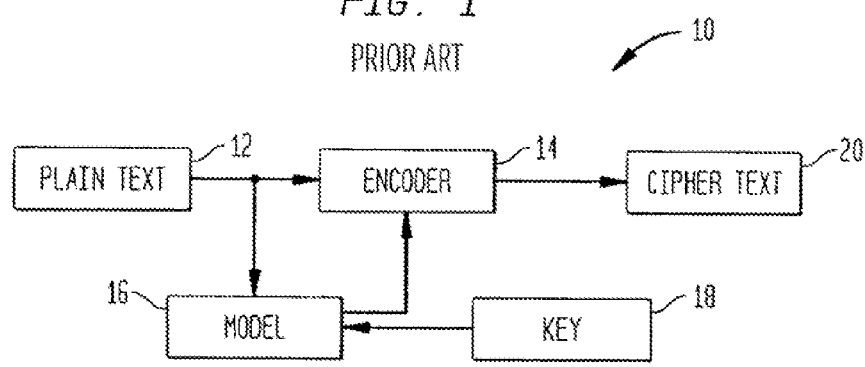
FIG. 1 illustrates a conventional, general, arithmetic coding, model-based encryption scheme.
Figure 2:
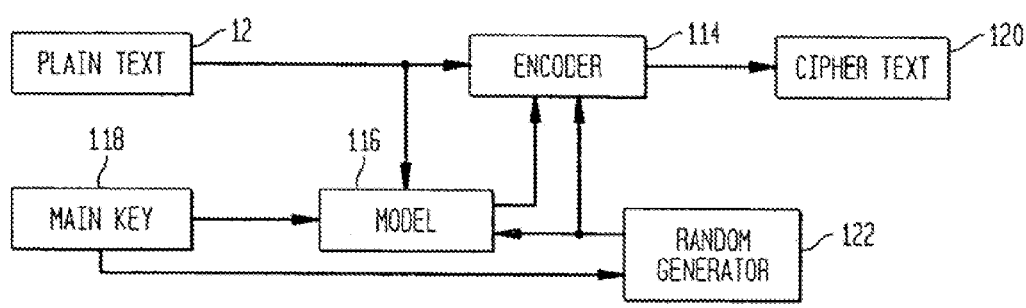
FIG. 2 illustrates an exemplary schematic flow for encryption in one exemplary embodiment of the present invention.

FIG. 2 illustrates an exemplary schematic flow for encryption in one embodiment of the present invention. As illustrated in FIG. 2, plain text 12 is input to both an encoder 114 and a model 116. A main key 118 is supplied to the model 116 and to a random generator 122. The random generator 122 produces working keys from the main key 118 and random numbers generated within and the working keys are output to the encoder 114 and the model 116. The model 116 provides to the encoder 114, two frequency counts, for 0 and 1, respectively and the encoder 114 output is a compressed bit stream. The encoder 114 produces compressed information (i.e., cipher text 120), based on the plain text 12 and the working keys output from the random number generator 122, and the frequency counts 0, 1 from the model 116.

The encoder 114 may operate as follows. A message to be encoded is represented by an interval of real numbers between 0 and 1. As the message becomes longer, the interval needed to represent the message decreases and the number of bits needed to specify the interval increase. Successive symbols of the message reduce the size of the interval in accordance with the symbol probabilities generated by the model 116. The more likely symbols reduce the range by less than the unlikely symbols and hence add fewer bits to the message.

Initially, the interval assigned to a message is the entire interval [0,1)([0,1) denotes the half-open interval $0 \leq x < 1$). As each symbol in the message is processed, the range is narrowed to that portion of the range allocated to the given symbol. For example, assume the alphabet is (a, b, c, d, e, f) and a fixed model is used with the probabilities shown in Table 1.

TABLE 1

| Symbol | Probability | Range |
|--------|-------------|-------------|
| a | 025 | [0, 0.25) |
| b | 0.25 | [0.25, 0.5) |
| c | 0.1 | [0.5, 0.6) |
| d | 0.1 | [0.6, 0.7) |
| e | 0.1 | [0.7, 0.8) |
| f | 0.2 | [0.8, 1.0) |

Assume the message abc is transmitted. Initially, the encoder 114 (and an associated decoder which will be described later) knows that the range is [0,1). After receiving the first symbol a, the encoder 114 narrows the range to [0,0.25), the range that model 116 allocates to the symbol a. The second symbol b narrows the new range to the second one-fourth, [0.0625, 0.125)—the previous range was 0.25 units long and one-fourth of that is 0.0625. The next symbol c is allocated [0.5, 0.6), which when applied to [0.0625, 0.125) gives the smaller range [0.09375, 0.1).

Suppose all the associated decoder knows about the message is the final range [0.9375, 0.1). The decoder can immediately deduce that the first character was a, since the range lies entirely within the space the model of Table 1 allocates for a. After this, the range is [0, 0.25). After seeing b [0.0625, 0.125) which entirely encloses the given range [0.09375, 0.1), the second character is b. Proceeding in this manner, the decoder can identify the whole message.

In one exemplary embodiment, the encoder 114 is the encoder described in copending U.S. application Ser. No. 09/240,576 entitled "Multiplication-Free Arithmetic Coding" filed on Feb. 1, 1999, the entire contents of which are hereby incorporated by reference. An advantage of this encoder are that there is no multiplication and division operation involved, which makes the hardware design simple. This encoder is described below.

Encoding

Initially, two registers R and L, are set to 1 and an arbitrary number, respectively. The encoder 114 is supplied with three inputs, a first frequency count $c_0$ representing a fractional value of the probability of 0, a second frequency count $c_1$, representing a fractional value of the probability 1, and a so-far encoded symbol i (either 0 or 1).

The encoding steps performed by the encoder 114 can be summarized in pseudocode as:

1. If $c_0 > c_1$, exchange the values of $c_0$ and $c_1$, and let i=!i.
2. While $R \leq c_1$, do
   Output the most significant bit of L.
   L=L<<=1, R=R<<=1.
   If R>~L, then R=~L+1.
3. If i=0, then R=$c_0$; else R=R−$c_0$, L=L+$c_0$.

Output L

Note that some C Language notation is employed in the above pseudocode. ! represents logic complement, ~represents binary complement, and <<=represents arithmetic shift left. From the description above, the present invention operates on the following assumption: for each iteration, $R \approx c_0 + c_1$.

$$L:=L, R:=c_0, i=0 \quad (1)$$

$$L:=L+c_0, R:=R-c_0, i=1 \quad (2)$$

In the present invention, initializing the two registers R and L to 1 and an arbitrary number, respectively, permits the first word in the output stream to denote a synchronous word for real time transmission applications. Further, step 1 is generally referred to as an exchange step, step 2 is referred to as an adjustment step, and step 3 is referred to as an encoding step. A magnitude step, which is required in conventional multiplication-free arithmetic coding techniques is not required in the present invention. In the present invention, the adjustment step is executed before the encoding step. In the adjustment step, executing the "while" loop when the value of register R is less than or equal to the value of the second frequency count and setting the value of register R equal to the binary complement of the value of register L plus one if the value of the register R is greater than the binary complement of the value of register R eliminates the need for a subsequent bit stuffing step.

To summarize, the method of multiplication-free arithmetic coding of the present invention produces an encoded bit stream by receiving a symbol from an encoded string and two frequency counts, finding a most probable symbol and a least probable symbol; subjecting a first register to magnitude shift operations for outputting bits to the encoded bit stream and for approximating a contextual probability of each symbol in the encoded string, and encoding a next symbol in the encoded string based on the contextual probability.

FIG. 3 includes the specific steps performed by the encoder 114 in the encoding process 20 in more detail. In particular, in step 22, registers R and L are initialized to 1 and the sync word, respectively. The encoded bit stream, in this example, 11011100i, is input along with the initial values of registers R and L to the 0-order Markov model at step 24 to produce the frequency counts $c_0$ and $c_1$. In step 26, $c_0$ and $c_1$ are compared and if $c_0$ is greater than $c_1$, $c_0$ and $c_1$ are exchanged and i is set to its logical complement at step 28. If however, $c_0$ is not greater than $c_1$, processing proceeds to step 30, where it is determined whether the value in register R is greater than or equal to $c_1$. If so, processing proceeds to step 32, where the most significant bit of the L register is output, L and R are arithmetically left shifted, and if R is greater than the binary complement of L, then R is set to the binary complement of L plus one, and processing returns to step 30. If the value of register R is not greater than equal to $C_1$, then processing continues to step 34. In step 34 it is determined whether i is equal to 0. If i is equal to 0, then the value of register R is set equal to $C_0$ at step 36 and if i is not equal to 0 then R is set to the previous value of R minus $c_0$ and L is set to the previous value of L plus $c_0$ in step 38, thereby encoding the next bit in the bit stream. The process then repeats by inputting the next bit to the Markov model update at step 24. The processing is continued until all bits of the input bit stream are encoded. Then, the value of register L is output as the encoded bit stream.

Although the present invention is described utilizing a 0-order Markov model, any model, known to one ordinary skill in the art, could be utilized.

As illustrated in FIG. 4, the model 116 includes a frequency table 130 (illustrated in FIG. 4 as RAMs 126; and shown in FIG. 5 as 130) and a model controller 128. The frequency counts contained in frequency table 130 represent the probabilities, such as the probabilities shown in Table 1. The plain text 12, the main key 118 and the working keys are input to the model controller 128. The random generator 122 generates one random bit per system clock. As illustrated in FIG. 5, the frequency table 130 may include two related terms that make it very difficult to trace all information saved in the frequency table 130 except the two related terms. The model 116 can use an address register r to record the closest t bits currently processed, the size of the frequency table 130 is $2^r$. In one embodiment, the model 116 is a t-order Markov model and r looks like sliding windows of size t. Initially, the values in the frequency table 130 may be set to 1.

The present invention may be described as a two phase cipher. The first phase processes random bits and key bits. In the first phase, the key size controls the random bit generator, so that controller 128 can obtain random bit string with the same size as the key. For each bit pair (one random bit, one key bit), controller 128 can perform the following:

1) according to a shift register in model controller 128, get F0 and F1 from RAMs 126;
2) if the key bit is 0, add 1 to F0; else add 1 to F1;
3) pass the random bit and F0, F1 to encoder 114;
4) if the random bit is 0, add 1 to F0; else add 1 to F1;
5) write F0 and F1 back to RAMs 126;
6) left shift the shift register in model controller 128, and insert the current random bit into the last position of the shift register.

In the first phase, the random bit is provided to encoder 114 (or decoder) via the model controller 128. When the first phase is completed, a useful initial frequency table is obtained in RAMs 126.

In the second phase, the plain text 12 is encoded. In the second phase, the plain text 12 is input to the model controller 128 which executes the following actions for each input bit:

1) according to the shift register, get F0 and F1 from RAMs 126;
2) pass the plain text bit and F0, F1 to encoder 114;
3) if the plain text bit is 0, add 1 to F0; else add 1 to F1;
4) write F0 and F1 back to RAMs 126;
5) left shift the shift register, and insert the current plain text bit into the last position of the shift register. Therefore, the plain text 12 also will pass to encoder 114 (or decoder) via the model controller 128.

FIG. 5 illustrates the frequency table 130 in one preferred embodiment of the present invention. As illustrated in FIG. 5, the frequency table 130 includes r entries for the frequency of 0 and r entries for the frequency of 1. The size of the frequency table 130 in one embodiment is $2^r$. In one embodiment, t=15.

The model controller 128 controls the read and writes of the RAMs 126 and the output of the frequency table 130 and source bit to the arithmetic coder 114. The inputs to the encoder 114 include a text bit from the plain text 12, a key bit from the main key 118, a random bit from the random bit generator 122, and two frequencies 136 from the RAMs 126. The output of the model controller 128 to RAMs 126 is a read-enable signal 138, a write-enable signal 140, modified frequencies 142 for bits "0" and "1", respectively and an address 144. The outputs from the model controller 128 to the encoder 114 include a source bit 146 and a pair of frequency counts 148 for bits "0" and "1". In one exemplary embodiment, the model 116 is implemented utilizing two clocks, a system clock and a RAM clock, in order to permit the model controller 128 to finish a read and write to the RAMs 126 in one system cycle.

The interaction between the encoder 114 and the model 116 is as follows. Initially, r may be set to a fixed number; the current value of r is used to find two frequency counts respectively for 0 and 1 from the frequency table 130. The two counts are then input to the encoder 114. The current bit is encoded and the frequency count is updated at the location pointed to by r. Then, slide r to contain the current bit and repeat until all bits are encoded.

As illustrated in the embodiment of FIG. 4, the frequency table 130 includes random access memories 126. The two RAMs 126 represent the frequency tables for bits "0" and "1", respectively. In one exemplary embodiment, there are a total of 64 k pairs of frequencies for bits "0" and "1". As a result, the frequency may range from 1 to 255. The encoder 114 implements an arithmetic encoding algorithm, where its input signal is a one bit source signal and a pair of frequencies for bits "0" and "1". For each time interval, the pair of frequencies are different and dependent on the input source bit. The output of the encoder 114 is the cipher-text 120 and an output valid bit 150.

The present invention may also use a key (any length of bit stream) to control the initial value in frequency table 130 and a random bit stream to control the values of r. The random bit stream may be generated by the random generator 122. The key for encryption is termed the working key. To be more precise, if $k_1, k_2, \ldots, k_n$ is the bit stream for encryption key. An exemplary algorithm is as follows:

Encryption

Initialization: r=0. Let all items in frequency table 130 be 1, initialize the encoder 114, j=1

Input: $k_1, k_2, \ldots k_n$

1. While j<=n, do

Find the location pointed by r from the frequency table 130.

If $k_j$=1, add 1 to frequency 1 location; else add 1 to frequency 0 location.

Use the current frequency counts to encode one bit l from random generator 122.

If l=1, add 1 to frequency 1 location; else add 1 to frequency 0 location.

Left shift r, r=r|the random bit

2. Encode plain text 12 and update model 116 as follows:

If current bit is 1, add 1 to frequency 1 location, else add 1 to frequency 0 location.

Left shift r, r=r|the current bit

It is noted that step 1 is used to generate the initial frequency table 130, the frequency table 130 may depend on environment, since random generator 122 is used. Further, even if the same encryption key is used at different times, a different frequency table 130 will result. This indicates the cipher in the present invention is not one-to-one but is variable.

In one preferred embodiment, VHDL language is used to describe the behavior model between the model controller 128 and the encoder 114 illustrated in FIG. 4. Exemplary VHDL is set forth below:

```
library IEEE ;
- use IEEE.std_logic_unsigned.all ;
   use IEEE.std_logic_signed.all ;
   use IEEE.std_logic_arith.all ;
   use IEEE.std_logic_1164.all ;
entity cipher is
 port (
   key      : in std_logic ;
   random   : in std_logic ;
   text     : in std_logic ;
   end_of_key : in std_logic ;
   end_of_text : in std_logic ;
   data0_in : in std_logic_vector ( 7 downto 0 ) ;
   data1_in : in std_logic_vector ( 7 downto 0 ) ;
   sys_clock : in std_logic ;
   mem_clock : in std_logic ;
   data0_out : out std_logic_vector ( 7 downto 0 ) ;
   data1_out : out std_logic_vector ( 7 downto 0 ) ;
   addr      : buffer std_logic_vector (15 dowoto 0 ) ;
   READ_ENABLE : out std_logic ;
   WRITE_ENABLE: out std_logic ;
  cipher_text : out std_logic ;
  out_valid : out std_logic
 ) ;
end cipher ;
architecture RTL of cipher is
signal encode_bit    : std_logic ;
signal encode_valid  : std_logic :='0';
signal c0,c1         : std_logic_vector ( 7 downto 0 ) ;
signal L             : std_logic_vector ( 31 downto 0 ) := "00000000000000000000000000000000";
signal R,H           : std_logic_vector ( 31 downto 0 ) := "00000000000000000000000000000001";
signal freq0         : std_logic_vector ( 7 downto 0) ;
signal freq1         : std_logic_vector ( 7 downto 0) ;
signal j             : std_logic;
begin
model_update : process
   variable a,b : integer ;
   variable counter : integer := –1 ;
   begin
     wait until mem_clock'event and mem_clock='1';
     counter := ( counter + 1 ) mod 8 ;
     case counter is
       when 0 => READ_ENABLE <= '1' ;
         WRITE_ENABLE <= '0' ;
         if(end_of_key='0') then
           addr <= SHL(addr,"01") + key ;
         else
           addr <= SHL(addr,"01") + text ;
         end if;
       when 2 => if(end_of_key='0') then
```

```
        encode_bit <= random ;
        c0 <= data0_in + not key;
        c1 <= data1_in + key;
        a := conv_integer(data0_in) + conv_integer(not key) + conv_integer(not random);
        b := conv_integer(data1_in) + conv_integer(key) + conv_integer(random);
      else
        encode_bit <= text ;
        c0 <= data0_in;
        c1 <= data1_in;
        a := conv_integer(data0_in) + conv_integer(not text);
        b := conv_integer(data1_in) + conv_integer(text);
      end if ;
      if(end_of_text='0') then
        encode_valid <= '1' ;
      else
        encode_valid <= '0' ;
      end if;
      READ_ENABLE <= '0' ;
      WRITE_ENABLE <= '1' ;
      if(a>16#FF# or b>16#FF#) then
        data0_out <= shr(conv_std_logic_vector((a+1),8),"01") ;
        data1_out <= shr(conv_std_logic_vector((b+1),8),"01") ;
      else
        data0_out <= conv_std_logic_vector(a,8) ;
        data1_out <= conv_std_logic_vector(b,8) ;
      end if ;
    when others => null ;
  end case ;
end process ;
arith_coder : process
  variable a,b,c : std_logic_vector (31 downto 0 ) ;
  variable f0,f1 : std_logic_vector (7 downto 0 ) ;
  variable k     : std_logic ;
  begin
    wait until sys_clock='1' and sys_clock'event ;
    if(encode_valid='1') then
      if(c0>c1) then
        freq0 <= c1 ;
        freq1 <= c0 ;
        j <= not encode_bit ;
      else
        freq0 <= c0 ;
        freq1 <= c1 ;
        j <= encode_bit ;
      end if ;
      f0 := freq0 ;
      f1 := freq1 ;
      k := j ;
      while R<=f1 loop
        cipher_text <= L(31) ;
        out_valid <= '1' ;
        a := shl(L,"01") ;
        b := shl(R,"01") ;
        c := not a ;
      L <= a;
      if b>a then
        R <= c + '1' ;
      else
        R <= b ;
      end if ;
      wait until mem_clock='1' and mem_clock'event ;
    end loop;
    out_valid <= '0' ;
    if(k='0') then
      R <= conv_std_logic_vector (conv_integer(f0),32);
    else
      R <= R - f0 ;
      L <= L + f0 ;
    end if ;
  end if;
end process ;
end RTL ;
```

EXAMPLE

The parameters used for testing in this example are as follows:

L—Low end of the encoding interval: 32 bits, initially 0
H—High end of the encoding interval: 32 bits, initially 1
R—Range of the encoding interval: 32 bits, initially 1
V—Register for decoding bit stream
$2^t$—size of the frequency table 130: 64K for both 0 and 1, t=15
r—Address pointer register for table: 15 bits

TABLE 2

Plain text "AAAAAAAAAAAAAAAAAAAAAAAAA"

| Experiments | Keys | Cipher Text (HEX) |
|---|---|---|
| 1 | A | B9 50 C8 C9 1B F8 44 10 |
| 2 | A | FA A1 91 91 3C 81 14 80 |
| 3 | A | 83 D3 C3 C7 28 1F 35 |
| 4 | AbCD8910 | 56 DF B4 56 894867 9E 82 28 28 28 66 45 21 40 |
| 5 | AbCD8910 | B9 72 D9 5D A0 F1 62 68 99 7D 7D 70 98 EE F8 |

TABLE 3

Plain text "It is incredible for us"

| Experiments | Keys | Cipher Text (HEX) |
|---|---|---|
| 1 | Zfg | E7 95 CE 8C A3 B7 7E 1D 98 9E 1E 6F 0D 77 32 14 C5 58 24 4b FF 40 69 43 1C 45 29 80 |
| 2 | Zfg | 2B CF 08 FD 5F 54 87 E1 D9 89 E1 E6 F0 D7 73 21 4C 55 82 44 BF F4 06 94 31 C4 52 98 |
| 3 | 123 | C4 99 9E F4 97 49 27 32 06 97 32 0A 0B 62 86 25 13 CA 51 2E 44 BA 86 72 45 CA 95 27 00 |
| 4 | 123 | E5 3D C0 5C 82 58 12 EA 84 95 52 85 69 0D 77 32 14 C5 58 24 4B FF 40 69 43 1C 45 29 80 |

From Tables 2 and 3 above, the following is apparent: 1) for the same plain text with the same key, different cipher text results, 2) the size of cipher text is changeable with different experiment parameters and different keys, and 3) for high correlative data the compression rate is high, but for less correlative date or a shorter string, the compression rate is also good.

The technique of the present invention may be used for encryption if the values in the frequency table are used as the encryption key. One difference between the present invention and WNC is the model. The bit-based model of the present invention makes it extremely difficult to trace all the initial values using a technique such as the one described by Bergen/Hogan. The compressed bit stream or cipher text 120 may be decoded by a reverse process.

Figure 6:
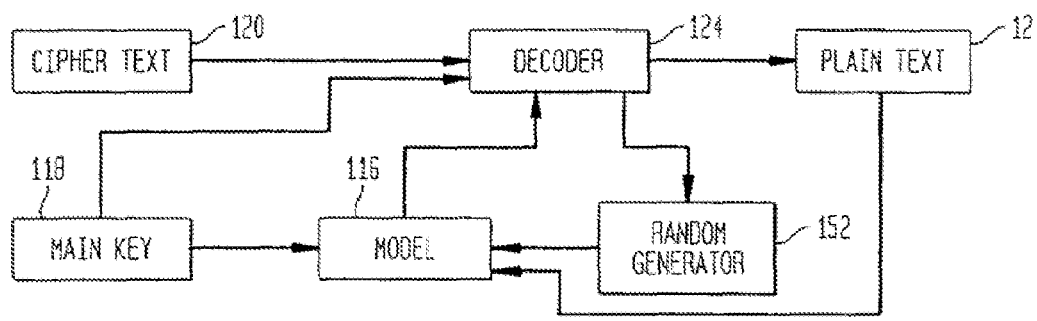
FIG. 6 illustrates an exemplary schematic flow of decryption in one exemplary embodiment of the present invention.
Figure 8:
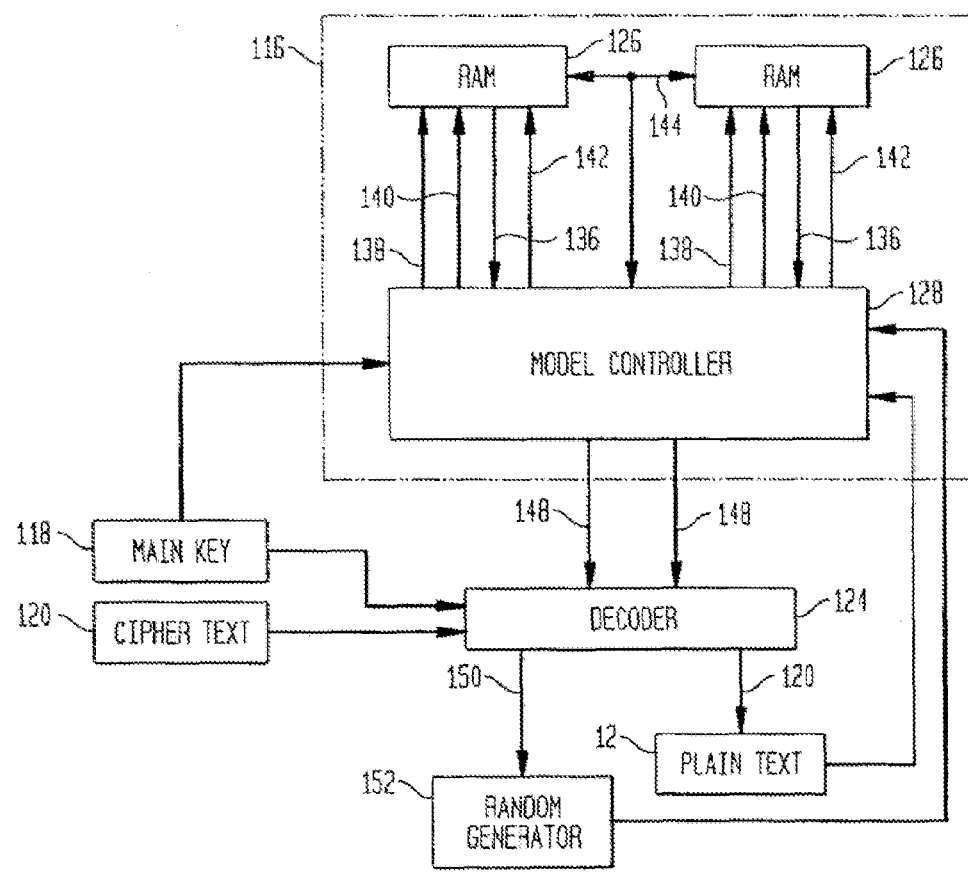
FIG. 8 illustrates a model in more detail in another exemplary embodiment of the present invention.

FIG. 6 illustrates an exemplary schematic flow of decryption in one embodiment of the present invention. As illustrated in FIG. 6, the cipher text 120 is input to a decoder 124. A main key 118 is input to the model 116 and to the decoder 124. The output of random bit generator 152 is input to the model 116. The output of the model 116 is input to the decoder 124. The decoder 124 decodes the cipher text 120 to produce the plain text 12 which is fed back to the model 116. The decoder 124 also passes an output to the random generator 152. In one exemplary embodiment, the decoder 124 is the decoder described in copending U.S. application Ser. No. 09/240,576 entitled "Multiplication-Free Arithmetic Coding" filed on Feb. 1, 1999, the entire contents of which are hereby incorporated by reference. This decoder is described in more detail below.

Decoding

For decoding the R and L registers are again initialized and a third register V is utilized to store part of the decoding bit stream, and i denotes the output bit. If S is the decoding bit stream, which is generated by the encoding algorithm described above, the decoding steps performed by the decoder 124 are summarized in pseudocode as:

1. If $c_0 > c_1$, exchange the values of $c_0$ and $c_1$, and let i=1; else i=0.

2. While $R \leq c_1$, do
   L=L<<1, R=R<<1, V=V<<1.
   V=V| next bit from S.
   If R>~L, then R=~L+1.

3. If $c_0 < V$, then $R=c_0$; else $R=R-c_0$, $L=L+c_0$, and i=!i

To summarize, the method of the multiplication-free arithmetic coding to produce a decoded string receives bits from a decoded stream and two frequency counts, finds a most probable symbol and a least probable symbol, subjecting a first register to magnitude shift operations for inputting bits from the decoded bit stream and for approximating a contextual probability of each symbol in the decoded string, and decoding a next symbol to the decoded stream based on the contextual probability.

Figure 7:
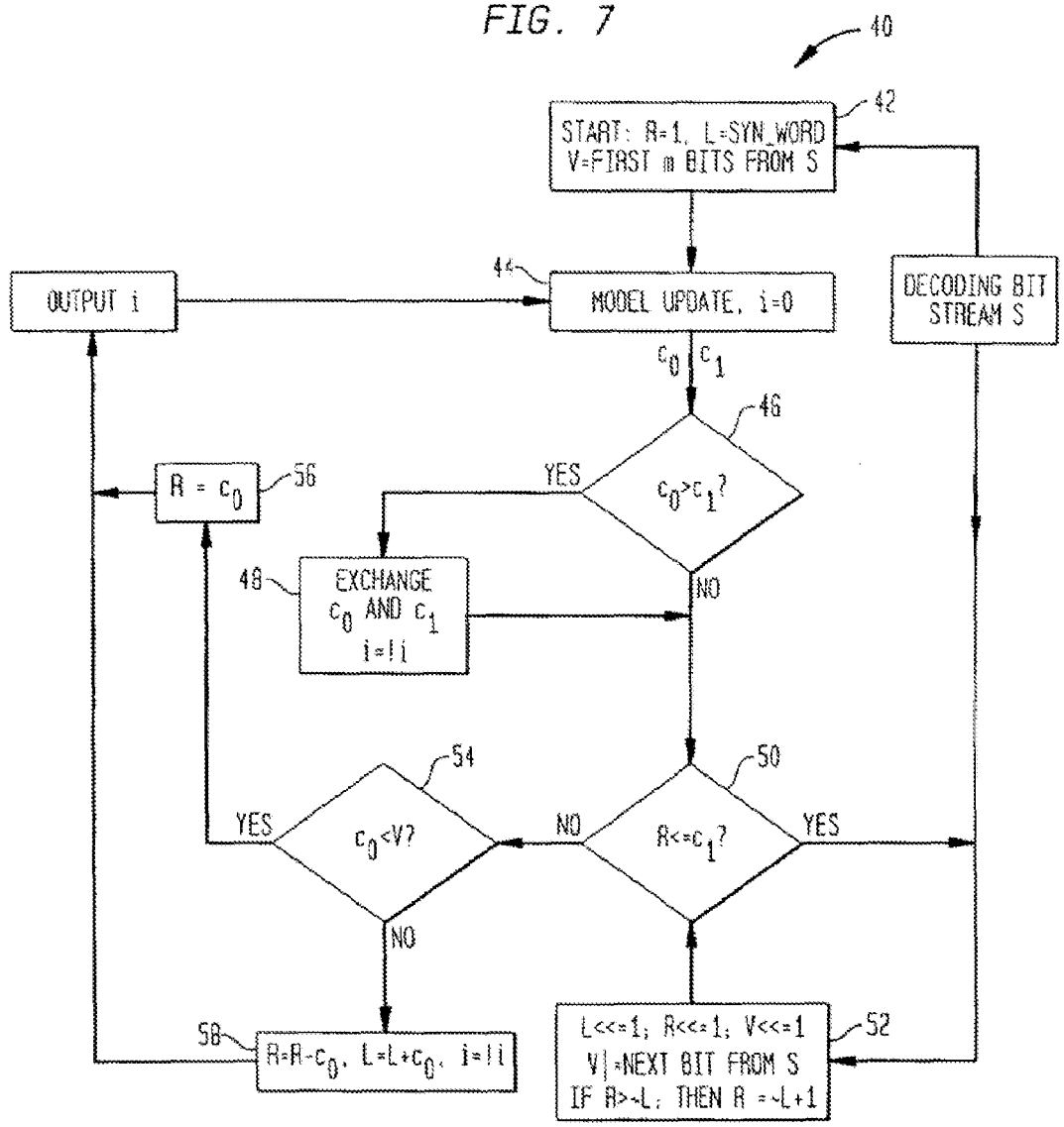
FIG. 7 illustrates a flowchart for decoding in one embodiment of the present invention.

FIG. 7 includes the specific steps performed by the decoder 124 in the decoding process 40 in more detail. In particular, in step 42, the register R, L, and V are initialized. The values of registers R, L, and V and the string to be decoded are input to 0-Markov model at step 44 to produce frequency counts $c_0$ and $c_1$. In step 46, $c_0$ and $c_1$ are compared and if $c_0$ is greater than $c_1$, $c_0$ and $c_1$ are exchanged and i is set to its logical complement at step 48. If however, $c_0$ is not greater than $c_1$, processing proceeds to step 50, where it is determined whether the value of register R is greater than or equal to $c_1$. If so, processing proceeds to step 52 where registers R, L, and V are all arithmetically left shifted, the next bit from the decoding bit stream S is added to register V, and if R is greater than the binary complement of L, then R is set to the binary complement of L plus one. Processing then returns to step 50.

If the value of register R is not greater than or equal to $c_1$, then processing continues to step 54. In step 54, it is determined whether $c_0$ is less than V. If $c_0$ is less than V, then the value of register R is set equal to $c_0$ at step 56 and if $c_0$ is not less than V, then R is set to the previous value of R minus $c_0$, L is set to the previous value of L plus $c_0$, and i is set to its logic complement at step 58, thereby decoding the next bit in the bit stream S. The process then repeats by inputting the next bit to the Markov model update at step 44. The processing is continued until all bits of the decoding bit stream S are decoded.

Again, although the present invention just described utilizing a 0-order Markov model, any model, known to one of ordinary skill in the art, could be utilized.

Table 4, set forth below, illustrates a compression ratio comparison for files of varying types, between an encoder which implements multiplication, the prior art technique disclosed in U.S. Pat. No. 4,652,856, and the multiplication-free arithmetic coding of the present invention.

TABLE 4

| Source File | Size | Multiplier Encoder | Encoder of the Present Invention | U.S. Pat. No. 4,652,856 |
|---|---|---|---|---|
| C source | 27620 | 37.5% | 38.4% | 39.9% |
| Chinese file | 72596 | 43.3% | 43.8% | 44.9% |
| Scale image | 262330 | 67.9% | 68.8% | 69.6% |
| EXE file | 54645 | 74.3% | 74.6% | 75.6% |
| Mixed data | 417192 | 67.2% | 68.0% | 68.9% |

As illustrated in Table 4, the present invention achieves a compression ratio better than prior art multiplication-free arithmetic techniques. Table 4 also illustrates that the multiplication encoder usually provides the best compression because each multiplication-free design utilizes some approximate value instead of practical probabilities, so there will usually some degradation in compression ratios utilizing multiplication-free arithmetic techniques. However, the present invention, as illustrated in Table 4, provides a low computationally complex and low cost hardware implementation, which still achieves compression ratios which are comparable to multiplication-base techniques.

As illustrated in FIG. 4, the main key 118 is supplied to the model controller 128. The model controller 128 controls the read and writes of the RAMs 126 and the output of the frequency table 130 and the source bit to the decoder 124. The inputs to the decoder 124 include a text bit from the cipher text 120, a key bit from the main key 118, and a pair of frequency counts 148 for bits "0" and "1". The output of the model controller 128 to RAMs 126 is a read enable signal 138, a write enable signal 140, modified frequencies 142 for bits "0" and "1", respectively, and an address 144. The RAMs 126 output two frequencies 136 to the model controller 128. In one exemplary embodiment, the model 116 is implemented utilizing two clocks, a system clock and a RAM clock, in order to permit a model controller 128 to finish read and write to the RAMs 126 in one system cycle.

The present invention may also be described as a two-phase decipher. In the first phase, random bits are decoded from cipher bits. In the first phase, the key size controls the decoder 124 so that the model controller 128 can receive random bit strings from the decoder 124 with the same size as the key. For each bit pair (one random bit and one key bit), decipher is performed by:

1) using a shift register in decoder 124, to get F0 and F1 from RAMs 126;
2) if the key bit is 0, add 1 to F0; add 1 to F1;
3) pass F0, F1 to decoder 124;
4) decoder 124 decodes random bit and send the random bit to model controller 128;
5) if the random bit is 0, the model controller 128 adds 1 to F0; else adds 1 to F1;
6) write F0 and F1 back into RAMs 126; and
7) shift the register left, and insert the current random bit into the last position of the shift register.

When the first phase is completed, a useful initial frequency table is obtained in RAMs 126.

In the second phase, the plain text 12 is decoded. In the second phase, only one input, the cipher text 120, is required and deciphering includes the following steps for each input bit:

1) according to the shift register, get F0 and F1 from RAMs 126;
2) pass F0, F1 to the decoder 124;
3) decoder 124 decodes a plain text bit and sends the plain text bit to model controller 126;
4) if the plain text bit is 0, add 1 to F0; else add 1 to F1;
5) write F0 and F1 back into to RAMs 126; and
6) shift the register left, and insert the current plain text bit into the last portion of the shift register. Therefore, plain text 12 will be output from decoder 124.

To decode an encrypted message, the frequency table 130 may be constructed and the random bit stream in the cipher text 120 can be recovered before decoding begin(s). Decoding can also be defined in pseudocode as follows:

Decryption
1. While j<=n, do
    Find the location pointed by r from the frequency table 130.
    If $k_j$=1, add 1 to frequency 1 location; else add 1 to frequency 0 location.
    Use the current frequency counts to decode one random bit l.
    If l=1, add 1 to frequency 1 location; else, add 1 to frequency 0 location.
    Left shift r, r=r| the random bit
2. Decode cipher text 120 and update model as follows:
    If current bit is 1, add 1 to frequency 1 location, else add 1 to frequency 0 location.
    Left shift r, r=r| current bit.

It is noted that the functional blocks in FIGS. 1-3, 6 and 8 may be implemented in hardware and/or software. The hardware/software implementations may include a combination of processor(s) and article(s) of manufacture. The article(s) of manufacture may further include storage media and executable computer program(s). The executable computer program(s) may include the instructions to perform the described operations. The computer executable program(s) may also be provided as part of externally supplied propagated signal(s).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An encryption device, comprising at least one processor, the at least one processor comprising:
    a random number generator,
        receiving a main key,
        generating a random bit stream, and
        outputting a working key based at least in part on the main key and the random bit stream;
    a bit-based model,
        receiving the main key,
        receiving the working key,
        receiving a plain text bit stream based at least in part on received plain text, and
        generating a first frequency count and a second frequency court based at least in part on the main key, the working key, and the plain text bit stream; and
    an encoder,
        receiving the plain text bit stream,
        receiving the first frequency count and the second frequency count,
        exchanging the first frequency count and the second frequency count based at least in part on a value of the first frequency count and a value of the second frequency count, adjusting a value of a first register and a value of a second register based at least in part on the value of the first frequency count and the value of the second frequency count, encoding the plain text bit stream based at least in part on a bit-based processing scheme, the adjusted value of the first register and the adjusted value of the second register, generating a cipher bit stream based at least in part on the encoded plain text bit stream, and outputting cipher text based at least in part on the cipher text bit stream.

2. The encryption device of claim 1, therein the working key produced by said random number generator is variable length.

3. The encryption device of claim 1, wherein said output cipher text is variable.

4. The encryption device of claim 1, wherein the working key and the main key are different.

5. The encryption device of claim 1, wherein said model includes at least one frequency table containing said frequency counts.

6. The encryption device of claim 5, wherein said at least one frequency table is stored in a RAM.

7. The encryption device of claim 5, wherein said at least one frequency table includes the working key.

8. A method of encrypting, comprising the steps of:

receiving a plain text bit stream based at least in part on received plain text;

receiving a main key;

generating a random bit stream;

outputting a working key based at least in part on the main key and the random bit stream;

generating a first frequency count and a second frequency count based at hand in part on the main key, the working key, and the plain text bit stream;

exchanging the first frequency count and the second frequency count based at least in part on a value of the first frequency count and a value of the second frequency count;

adjusting a value of a first register and a value of a second register based at least in part on the value of the first frequency count and the value of the second frequency count;

encoding the plain text bit stream based at least in part on a bit-based processing scheme, the adjusted value of the first register and the adjusted value of the second register;

generating a cipher text bit stream based at least in part on the encoded plain text bit stream; and outputting cipher text based at least in part on the cipher text bit stream;

wherein the steps are performed by at least one processor.

9. The method of claim 8, wherein said bit-based processing scheme includes generating a random bit swing of a length equal to said working key.

10. The method of claim 8, wherein, in said bit-based processing scheme, different working key bits produce a different at least one frequency table.

11. The method of claim 8, wherein said output cipher text is variable.

12. The method of claim 10, wherein said at least one frequency table includes the working key.

13. A decryption device, comprising at least one processor, the at least one processor comprising:

a random number generator, receiving a decoded first bit stream, and generating a random bit stream based at least in part on the decoded first bit stream;

a bit-based model, receiving a main key, receiving said random bit stream, receiving a plain text bit stream, and generating crating a first frequency count and a second frequency count based at least in part on the main key, the indent bit stream, and the plain text bit stream; and a decoder, receiving a cipher text bit stream based at least in part on received cipher text, receiving said main key, receiving said first frequency count and said second frequency count, exchanging the first frequency count and the second frequency count based at least in part on a value of the first frequency count and a value of the second frequency count, adjusting a value of a first register and a value of a second register based at least in part on the value of the first frequency count and the value of the second frequency count, decoding said cipher text bit stream based at least in part on a bit-based processing scheme, the adjusted value of the first register, and the adjusted value of the second register, generating said decoded first bit stream, generating said plain text bit stream based at least in part on said decoded cipher text bit stream, and outputting plain text based at least in part on the plain text bit stream.

14. The decryption device of claim 13, wherein said decoded first bit stream is variable.

15. The decryption device of claim 13, wherein said model includes at least one frequency table containing said frequency counts.

16. The decryption device of claim 15, wherein said at least one frequency table is stored in a RAM.

17. The decryption device of claim 15, wherein said at least one frequency table includes the key.

18. A method of decrypting, comprising the steps of:

receiving cipher text;

generating a cipher text bit stream based at least in part on the received cipher text;

receiving a main key;

generating a random bit stream based at least in part on a decoded first bit stream;

generating a first frequency count and a second frequency count based at least in part on the main key, the random bit stream, and the cipher text bit stream;

exchanging the first frequency count and the second frequency count based at least in part on a value of the first frequency count and a value of the second frequency count;

adjusting a value of a first register and a value of a second register based at least in part on the value of the first frequency count and the value of the second frequency count;

decoding said cipher text bit stream based at least in part on a bit-based processing scheme, the adjusted value of the first register, and the adjusted value of the second register;

generating said plain text bit stream based at least in part on said decoded cipher text bit stream; and outputting plain text based at least in part on the plain text bit stream;

wherein the steps are performed by at least one processor.

19. The method of claim 18, wherein said bit-based processing scheme includes generating a random bit string of a length equal to said key.

20. The method of claim 18, wherein, in said bit-based processing scheme, different key bits produce a different at least one frequency table.

21. The method of claim 18, wherein said decoded first bit stream is variable.

22. An article of manufacture compromising a storage medium storing one or more executable computer programs that include instructions for the processor to perform the steps of the method of claim 8.

23. An article of manufacture comprising a storage medium storing one or in executable computer programs that include instructions for the processor to perform the steps of the method of claim 18.

* * * * *

UNITED STATES PATENT AND TRADEMARK OFFICE
CERTIFICATE OF CORRECTION

PATENT NO.        : 7,664,267 B2                                           Page 1 of 1
APPLICATION NO.   : 11/170900
DATED             : February 16, 2010
INVENTOR(S)       : Chenggang Duan et al.

It is certified that error appears in the above-identified patent and that said Letters Patent is hereby corrected as shown below:

In the claims:

Claim 1, col. 14, line 57, please delete "court" and insert --count--.

Claim 2, col. 15, line 13, please delete "therein" and insert --wherein--.

Claim 8, col. 15, line 36, please delete "hand" and insert --least--.

Claim 9, col. 15, line 56, please delete "swing" and insert --string--.

Claim 13, col. 16, line 9, please delete "crating".

Claim 13, col. 16, line 11, please delete "indent" and insert --random--.

Claim 23, col. 18, line 6, please delete "in" and insert --more--.

Signed and Sealed this

Thirtieth Day of March, 2010

David J. Kappos
*Director of the United States Patent and Trademark Office*